United States Patent
Wagner

(10) Patent No.: US 8,705,071 B2
(45) Date of Patent: Apr. 22, 2014

(54) BITMAP COMPARE MECHANISM

(75) Inventor: David Wagner, Broomfiled, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 141 days.

(21) Appl. No.: 13/438,578

(22) Filed: Apr. 3, 2012

(65) Prior Publication Data

US 2013/0258386 A1   Oct. 3, 2013

(51) Int. Cl.
*H04N 1/60* (2006.01)
*H04N 1/00* (2006.01)

(52) U.S. Cl.
CPC .................................. *H04N 1/00* (2013.01)
USPC ........ 358/1.14; 358/3.26; 358/3.27; 358/3.23

(58) Field of Classification Search
USPC .................. 358/1.14, 1.9, 3.23, 3.26, 3.27; 382/232, 131
See application file for complete search history.

(56) References Cited

U.S. PATENT DOCUMENTS

| | | | |
|---|---|---|---|
| 6,766,056 B1 | 7/2004 | Huang et al. | |
| 7,167,602 B2 | 1/2007 | Yamashita et al. | |
| 7,272,241 B2 | 9/2007 | Demi et al. | |
| 7,376,275 B2 | 5/2008 | Simard et al. | |
| 8,391,577 B2 * | 3/2013 | Takahashi | 382/131 |
| 2007/0103704 A1 * | 5/2007 | Chou et al. | 358/1.9 |
| 2007/0230770 A1 | 10/2007 | Kulkarni et al. | |
| 2009/0323123 A1 * | 12/2009 | Walton et al. | 358/3.23 |
| 2010/0027883 A1 | 2/2010 | Thoma | |
| 2011/0141521 A1 | 6/2011 | Qiao | |
| 2011/0205226 A1 * | 8/2011 | Gremse et al. | 345/419 |
| 2012/0002890 A1 * | 1/2012 | Mathew | 382/232 |

FOREIGN PATENT DOCUMENTS

JP    2008005194    *  1/2008  ............ H04N 5/335

* cited by examiner

*Primary Examiner* — Jerome Grant, II
(74) *Attorney, Agent, or Firm* — Blakely, Sokoloff, Taylor & Zafman LLP

(57) ABSTRACT

A computer generated method disclosed. The method includes performing an exact comparison between a first bitmap and a second bitmap, calculating a number of miscompared pixels that occurred during the comparison and calculating a quantity value representing a characteristic of the miscompared pixels.

17 Claims, 5 Drawing Sheets

| | |
|---|---|
| Exact: | 13229 |
| Fuzzy: | 0 |
| Coverage ratio: | 0.985 |
| BB left diff: | 0 |
| BB top diff: | 0 |
| BB right diff: | 0 |
| BB bottom diff: | 0 |
| Moment: | 0.744 |

| | |
|---|---|
| Exact: | 13225 |
| Fuzzy: | 0 |
| Coverage ratio: | 1.000 |
| BB left diff: | 0 |
| BB top diff: | 0 |
| BB right diff: | 0 |
| BB bottom diff: | 0 |
| Moment: | 0.044 |

BITMAP COMPARE MECHANISM

FIELD OF THE INVENTION

The invention relates to the field of printing systems. Particularly, the invention relates to ensuring quality printing at a printing system.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer. Once a connection is established between a workstation and the printer, printing software is implemented at a print server to manage a print job from order entry and management through the complete printing process.

In high-speed production printers, software maintenance and/or upgrade changes are often necessary to improve printer performance. After such changes however, the print quality must be verified. One method of verifying print quality is to compare a bitmap file of page images generated during a print job prior to the changes with a bitmap file of the same print job generated after the changes.

In such a method, bitmap compare software is used to examine page images generated by a printer to ensure that changes do not affect printed results, or to ensure that defects have been fixed. In automated bitmap comparisons, different methods may be used to detect different types of problems. Such methods include an Exact method in which pixels must be identical, a Neighbor method that allows small shifts in position, a Fuzzy method which permits small shifts in position and different anti-aliasing a Threshold method that allows for small shifts in gray or color levels, as well as Coverage and Bounding Box methods. A problem with each of these methods is that they are global and do not characterize the distribution of miscompared pixels.

Therefore, mechanism to calculate a value that characterizes the global distribution of miscompared pixels is desired.

SUMMARY

In one embodiment a computer generated method is disclosed. The method includes performing an exact comparison between a first bitmap and a second bitmap, calculating a number of miscompared pixels that occurred during the comparison and calculating a quantity value representing a characteristic of the miscompared pixels.

In yet a further embodiment a computer system is disclosed, including a memory to store bitmap compare software and a processor coupled to the memory to execute the bitmap compare software by performing an exact comparison between a first bitmap and a second bitmap, calculating a number of miscompared pixels that occurred during the comparison and calculating a quantity value representing a characteristic of the miscompared pixels.

BRIEF DESCRIPTION OF THE DRAWINGS

A better understanding of the present invention can be obtained from the following detailed description in conjunction with the following drawings, in which.

DETAILED DESCRIPTION

A bitmap compare mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
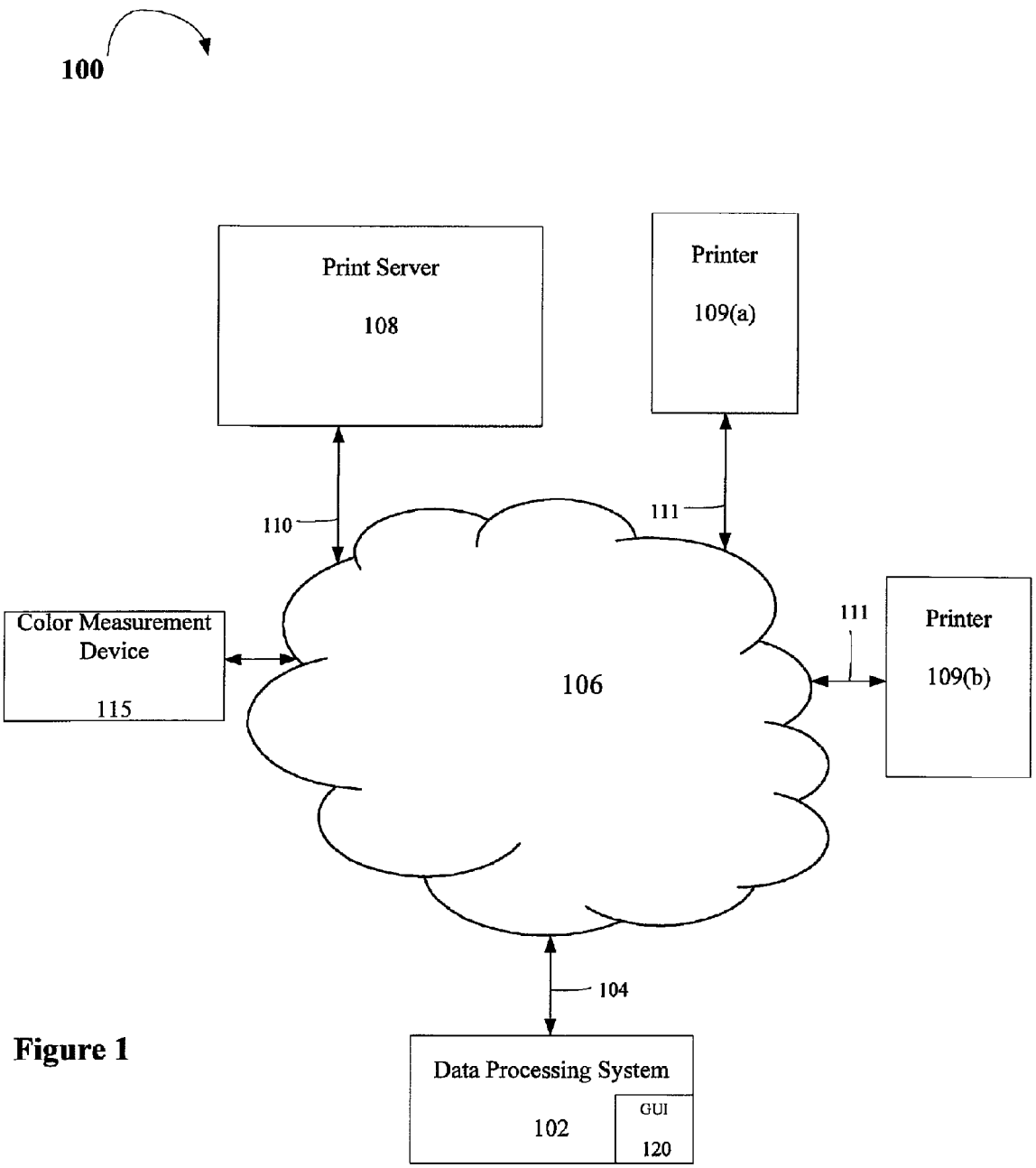
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system, or other operating system, and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111.

In one embodiment, a print application at data processing system 102 allows a user to select the desired print server 108 and submit requests for service requests to printer 109 via print server 108 over network 106. In a further embodiment, the print application implements the (Advanced Function Presentation) AFP™ presentation system developed by International Business Machines Corporation to represent documents in a data format that is independent of the methods that are utilized to capture or create those documents. However, other embodiments may implement PostScript (PS) and Portable Document Format (PDF) data streams.

Although described as separate entities, other embodiments may include print server 108 being incorporated in one or more of the printers 109. In yet further embodiments, the print server and printer may be physically separate entities. Therefore, the data processing system network depicted in FIG. 1 is selected for the purposes of explaining and illustrating the present invention and is not intended to imply architectural limitations. Those skilled in the art will recognize that various additional components may be utilized in conjunction with the present invention.

According to one embodiment, print server 108 implements a printing software product that manages the printing of documents from data processing system 102 and one or more of printers 109. In other embodiments, the printing software product manages printing of documents from multiple data processing systems 102 to the one or more printers 109. In one embodiment, the printing software product may be implemented using either InfoPrint Manager (IPM) or InfoPrint ProcessDirector (IPPD), although other types of printing software may be used instead.

In a further embodiment, the print application at data processing system 102 interacts with the printing software product to provide for efficient transmission of print jobs. The printing software product may include a graphical user interface (GUI) 120 accessible at a data processing system 102 that enables a system administrator (or operator) to interact with the printing software product and print application. In such an embodiment, GUI 120 includes bitmap compare software.

In one embodiment, bitmap compare software performs various algorithms that compare printed page output from printer 109 in the form of bitmap images. Thus, the bitmap compare software compares the printed page output generated by two or more print jobs (e.g., printer page images that are supposed to be identical). In such an embodiment, the printed page output includes a TIFF file of images of each page produced during a print job.

According to one embodiment, the bitmap compare software simultaneously runs multiple methods (e.g., Exact, Neighbor, Fuzzy, Threshold, Coverage and Bounding Box) in order to examine the characteristics of the resulting numbers. Implementing multiple compare methods enables a more accurate analysis of potential discrepancies between images.

For example, the Fuzzy method may not be considered important in some instances since the method accounts for few-pixel shifts in objects on a page. Particularly, in instances where the Exact method returns a large number while the Fuzzy method returns a small number, all of the miscompared pixels (pixels in the compared bitmaps that do not match) are expected to be adjacent to objects on the page. Thus, the errors are likely due to tiny shifts in object positions, or artifacts such as anti-aliasing along lines or curves.

Conversely, if the Exact and Fuzzy methods both return large values, there is probably an isolated object somewhere on the page that is present in one page image, but missing in the other. Accordingly, by simultaneously performing multiple methods and comparing the resulting metrics, it is possible to characterize the problems that occur in generating the bitmaps, thereby enabling the system user to concentrate on certain types of bad pairs of bitmaps.

According to one embodiment, a Moment bitmap compare method is disclosed to enhance the characterization of the problems that occur in generating the bitmaps. In such an embodiment, the Moment bitmap compare method receives two input bitmaps and runs the Exact comparison method to find all pixels that do not match between the two images, and subsequently calculates a quantity that characterizes how compact or diffuse the miscompared pixels.

In a further embodiment, the Moment bitmap compare method uses the same formula used in physics for calculating the moment of inertia of an object (e.g., $I=\int Qr^2 dV$, where $Q$ is the density of the object, and r is the radius measured from the center of mass). This number describes how easy (or difficult) it is to rotate the object. However, for purposes of comparing bitmaps, the magnitude of I is implemented to represent the characteristic of an object (e.g., small for compact objects and large for distributed objects, or for objects whose mass is far from the center).

Figure 2:
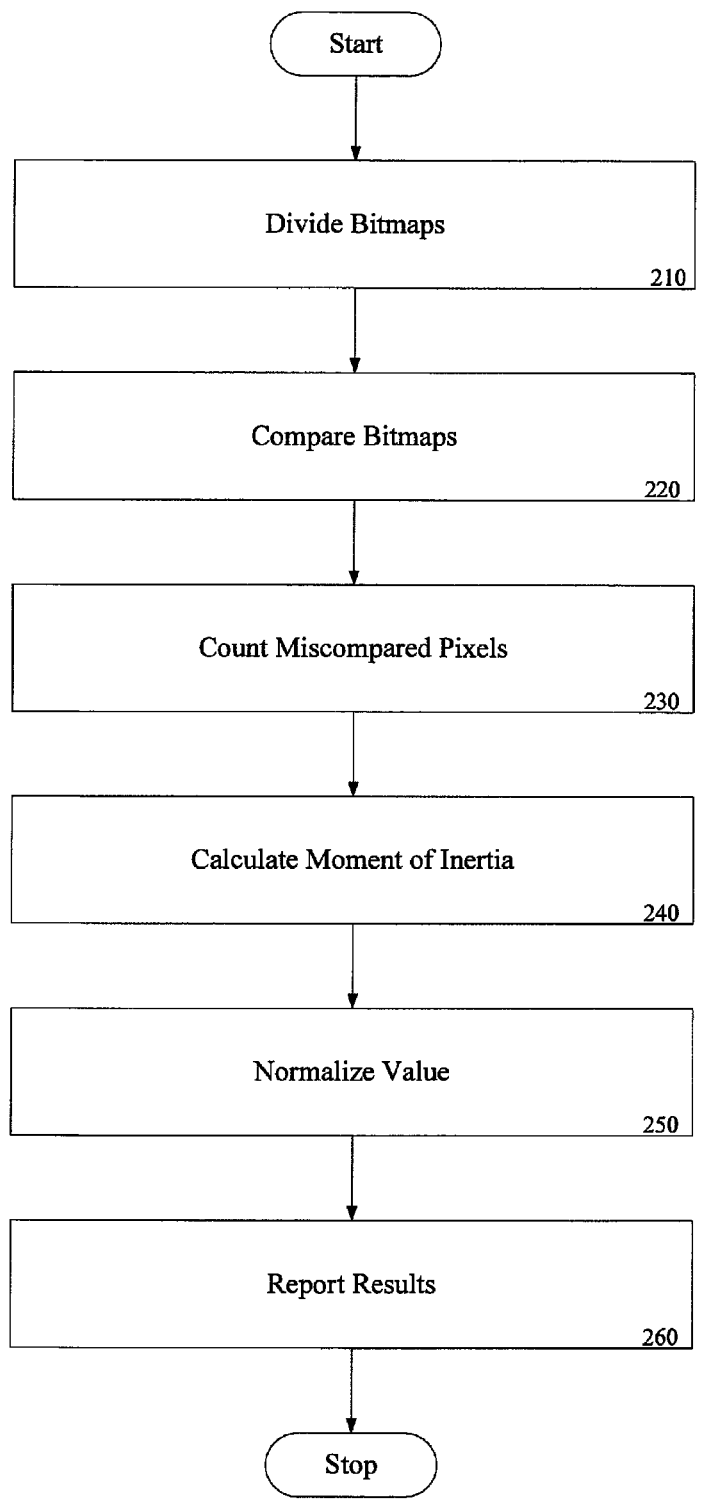
FIG. 2 is a flow diagram illustrating one embodiment of a bitmap compare method.

FIG. 2 is a flow diagram illustrating one embodiment of performing a Moment bitmap compare method. At processing block 210, each of the bitmaps is divided into 100×100 rectangular bins. However in other embodiments, different bin sizes may be implemented. At processing block 220, an exact comparison between the two bitmaps is performed. At processing block 230, the number of miscompared pixels in each bin is counted.

At processing block 240, the quantity I is calculated. In one embodiment, $I=\Sigma nr^2$, where n is the number of miscompared pixels in each bin and r is the radius measured as a distance from the center the miscompared pixels. In a further embodiment, r is defined to be the distance from the center of the image rather than the center of the miscompared pixels. In this embodiment, the resulting number provides an indication of whether the miscompared pixels are near the center of the page or the edges. In yet a further embodiment, both radius numbers are calculated for comparison.

At processing block 250, the calculated quantity value I is normalized. In one embodiment, the result I is normalized to the quantity that would be calculated if all bad pixels were uniformly distributed over the entire page. Thus, the resulting number will generally be between 0.0 and 1.0 for any bitmap of any size, where a small number means a more compact shape. However the number can be larger than 1.0 if all of the bad pixels are at the outside edges of the bitmaps. At processing block 260, the results of the normalized calculations are reported.

Figure 3B:
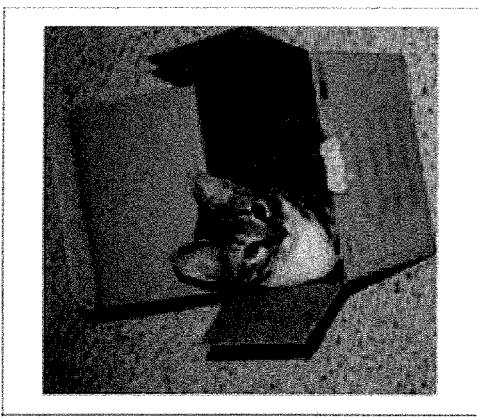
FIGS. 3A-3C are exemplary printed pages of an image.
Figure 3C:
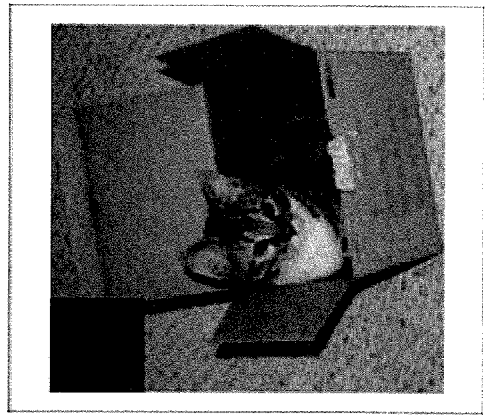
Figure 3A:

FIGS. 3A-3C illustrate bitmaps from printed pages. FIG. 3A shows a bitmap from a printed page in which most of the page is covered with an image (e.g., a JPEG object container), while FIG. 3B illustrates random noise on top of the image (e.g., representing artifacts from a lossy compression method such as JPEG). FIG. 3C shows a large black block overlaying the image (e.g., another object that was accidentally overlayed on the image).

Figure 4A:
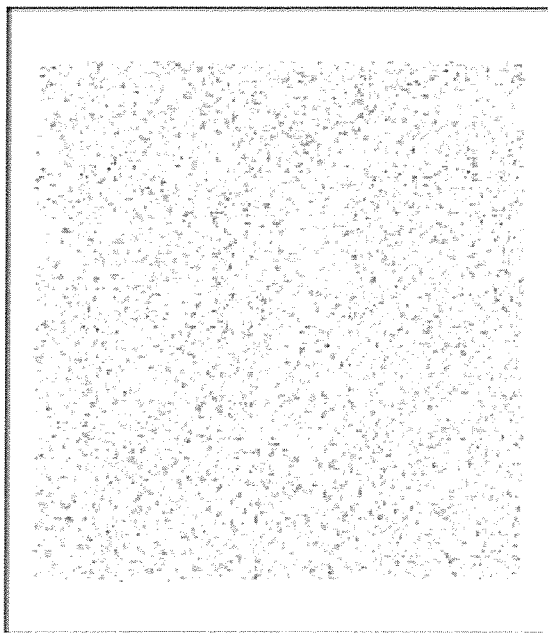
FIGS. 4A and 4B illustrate one embodiment of differences between images.
Figure 4B:
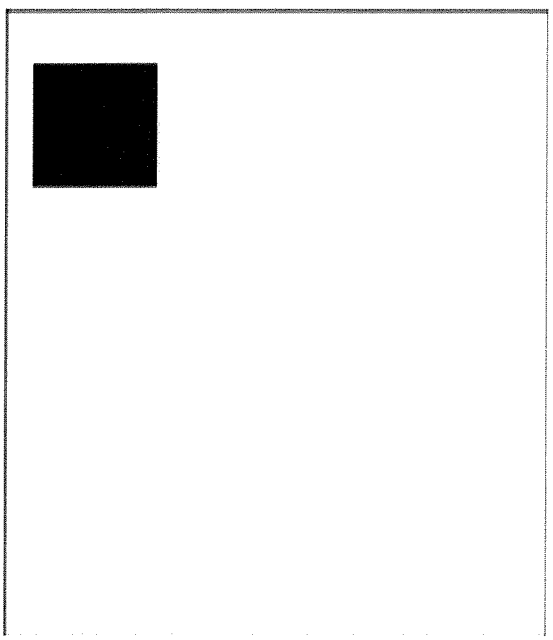

FIG. 4A and FIG. 4B illustrate the results of the Exact method between the modified bitmaps (FIGS. 3B and 3C, respectively) and the original (FIG. 3A), where black pixels in these figures represent the locations of pixels that miscompare. Note the important feature that FIGS. 3B and 4A show the noise spread out over the entire page, while FIGS. 3C and 4B show a compact region of noise.

FIG. 4A and FIG. 4B also shows the numerical results for the bitmap compare methods. Note that all of the metrics are almost identical between the two images, except for the Moment method, which shows that the problems occurring in the generation of FIGS. 3B and 3C are distinctly different.

Figure 5:
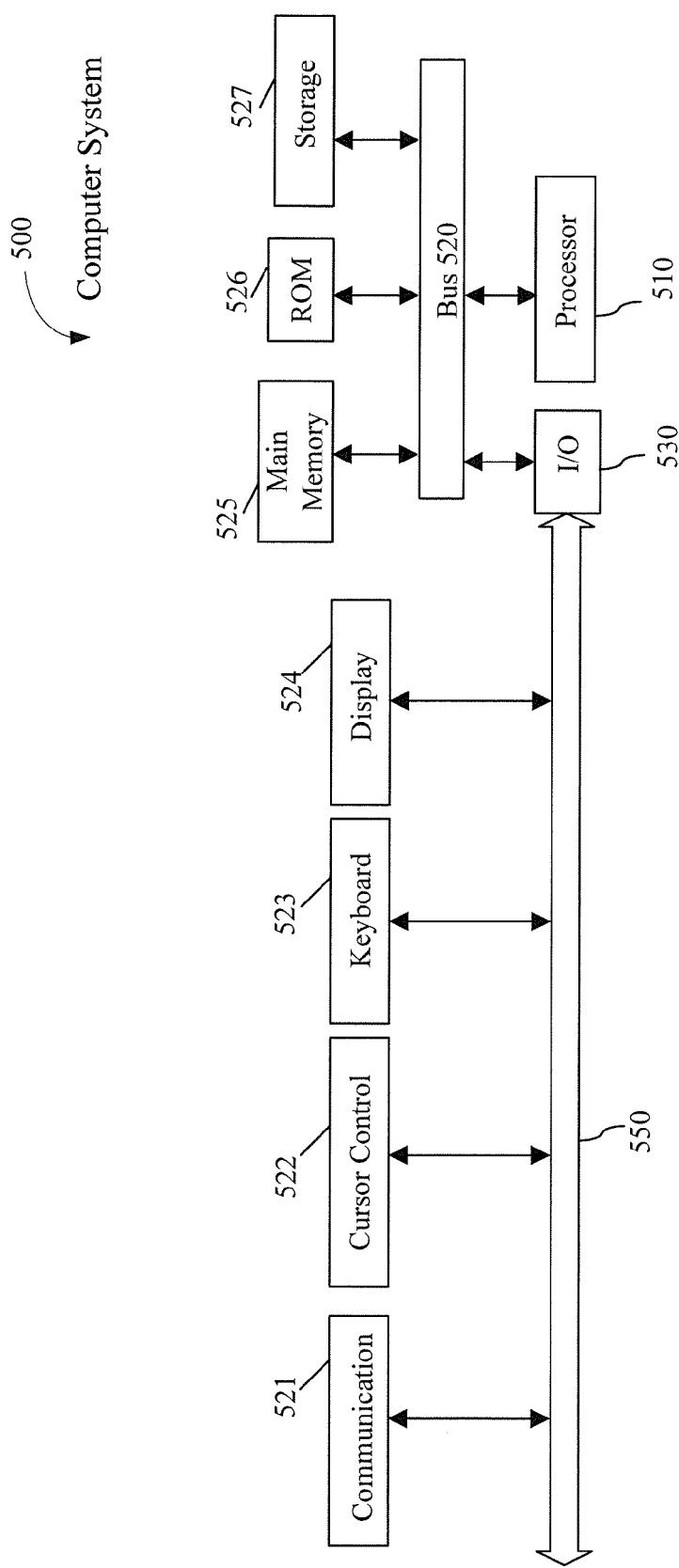
FIG. 5 illustrates one embodiment of a computer system.

FIG. 5 illustrates a computer system 500 on which data processing system 102 and/or server 108 may be implemented. Computer system 500 includes a system bus 520 for communicating information, and a processor 510 coupled to bus 520 for processing information. Computer system 500 further comprises a random access memory (RAM) or other dynamic storage device 525 (referred to herein as main memory), coupled to bus 520 for storing information and instructions to be executed by processor 510.

Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510. A data storage device 525 such as a magnetic disk or optical disc and its corresponding drive may also be coupled to computer system 500 for storing information and instructions.

Computer system 500 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A computer generated method comprising:
a processor performing an exact comparison between a first bitmap and a second bitmap;
the processor calculating a number of miscompared pixels that occurred during the comparison; and
the processor calculating a quantity value representing a characteristic of the miscompared pixels, wherein the quantity value=$\Sigma nr^2$, where n is the number of miscompared pixels in each bin and r is a radius measured as a distance from a center of the miscompared pixels.

2. The method of claim 1 wherein r is a radius measured as a distance from the center of the image.

3. The method of claim 1 further comprising normalizing the quantity value that would be calculated if all bad pixels were uniformly distributed over an entire page.

4. The method of claim 3 wherein a quantity value having a large magnitude represents the characteristic of the miscompared pixels as being diffuse.

5. The method of claim 3 wherein a quantity value having a small magnitude represents the characteristic of the miscompared pixels as being compact.

6. The method of claim 1 further comprising dividing the first bitmap and the second bitmap into rectangular bins.

7. The method of claim 6 wherein the rectangular bins are 100×100.

8. The method of claim 7 wherein calculating the number of miscompared pixels comprises calculating a number of miscompared pixels in each bin.

9. A computer system comprising:
a memory to store bitmap compare software;
a processor, coupled to the memory, to execute the bitmap compare software by performing an exact comparison between a first bitmap and a second bitmap, calculating a number of miscompared pixels that occurred during the comparison and calculating a quantity value representing a characteristic of the miscompared pixels, wherein the quantity value=$\Sigma nr^2$, where n is the number of miscompared pixels in each bin and r is a radius measured as a distance from a center of the miscompared pixels.

10. The computer system of claim 9 further comprising normalizing the quantity value that would be calculated if all bad pixels were uniformly distributed over an entire page.

11. The computer system of claim 10 wherein a large quantity value represents the characteristic of the miscompared pixels as being diffuse.

12. The computer system of claim 10 wherein a small quantity value represents the characteristic of the miscompared pixels as being compact.

13. The computer system of claim 9 further comprising dividing the first bitmap and the second bitmap into rectangular bins.

14. The computer system of claim 13 wherein calculating the number of miscompared pixels comprises calculating a number of miscompared pixels in each bin.

15. An article of manufacture comprising a non-transitory machine-readable medium including data that, when accessed by a machine, cause the machine to perform operations comprising:
performing an exact comparison between a first bitmap and a second bitmap;
calculating a number of miscompared pixels that occurred during the comparison;
calculating a quantity value representing a characteristic of the miscompared pixels, wherein the quantity value=$\Sigma nr^2$, where n is the number of miscompared pixels in each bin and r is a radius measured as a distance from a center of the miscompared pixels; and
normalizing the quantity value that would be calculated if all bad pixels were uniformly distributed over an entire page.

16. The article of manufacture of claim 15 comprising a machine-readable medium including data that, when accessed by a machine, cause the machine to perform operations comprising dividing the first bitmap and the second bitmap into rectangular bins.

17. The method of claim 16 wherein calculating the number of miscompared pixels comprises calculating a number of miscompared pixels in each bin.

\* \* \* \* \*